(12) United States Patent
Gunther

(10) Patent No.: US 8,632,016 B2
(45) Date of Patent: Jan. 21, 2014

(54) RFID CHIP EMPLOYING AN AIR GAP BUFFER

(75) Inventor: William G. Gunther, Guilford, CT (US)

(73) Assignee: George Schmitt & Company, Inc., Guilford, CT (US)

( * ) Notice: Subject to any disclaimer, the term of this patent is extended or adjusted under 35 U.S.C. 154(b) by 0 days.

(21) Appl. No.: 13/545,470

(22) Filed: Jul. 10, 2012

(65) Prior Publication Data
US 2013/0015247 A1   Jan. 17, 2013

Related U.S. Application Data

(60) Provisional application No. 61/506,457, filed on Jul. 11, 2011.

(51) Int. Cl.
*G06K 19/06* (2006.01)

(52) U.S. Cl.
USPC ............................ 235/492; 235/380; 235/375

(58) Field of Classification Search
USPC .................. 235/492, 380, 375, 451, 487, 488
See application file for complete search history.

(56) References Cited

U.S. PATENT DOCUMENTS

| | | | |
|---|---|---|---|
| 5,523,750 A * | 6/1996 | de Vall | 340/870.31 |
| 2006/0028344 A1* | 2/2006 | Forster | 340/572.7 |
| 2009/0096696 A1* | 4/2009 | Joyce et al. | 343/793 |
| 2010/0192371 A1* | 8/2010 | Sunohara et al. | 29/830 |

* cited by examiner

*Primary Examiner* — Edwyn Labaze
(74) *Attorney, Agent, or Firm* — St. Onge Steward Johnston & Rees LLC

(57) ABSTRACT

An RFID tag incorporating an arched buffer such that the RFID inlay containing the RFID transponder is held away from the mounting surface. This has the advantage of reducing RF signal degradation caused by the electromagnetic properties of the material.

12 Claims, 3 Drawing Sheets

RFID CHIP EMPLOYING AN AIR GAP BUFFER

CROSS-REFERENCE TO RELATED APPLICATIONS

This application claims the benefit, under 35 U.S.C. §119 (e), of Provisional Patent Application Ser. No. 61/506,457 filed Jul. 11, 2011, the content of which is hereby incorporated by reference in its entirety.

FIELD OF THE INVENTION

This invention relates to radio frequency identification (RFID) tags.

BACKGROUND OF THE INVENTION

Radio Frequency Identification ("RFID") is a technology for identifying or receiving information about physical objects from a distance using a small radio transponder. The components of the radio transponder, including any microprocessor or antenna, can be incorporated into an RFID inlay. An RFID inlay is typically packaged into an RFID tag to be attached to the surface of the object. Applications of this technology include retail inventory control, package and baggage tracking, authentication and security, and so forth.

An RFID reader is used to communicate with an RFID tag using radio frequency ("RF") signals to receive stored information. Often, this information is about the object to which the tag is attached. RFID readers will typically transmit a signal to the tag in order to activate the RFID tag, communicate or rewrite data, and/or to supply power to the tag. In response, the reader will receive a RF signal from the RFID tag containing information. Clear electromagnetic communications between the tag and reader are critical for proper transmission of data. Anything interfering with RF signals in the area can create a problem that must be addressed.

RFID tags can suffer from significant RF signal degradation when placed in proximity to a material. The degree of degradation is related to the electromagnetic properties of the material, the distance between the antenna and the material, and the frequency of the signal. Unfortunately, many materials to which it would be desirable to attach an RFID tag have poor electromagnetic characteristics for the transmission of signals using common RFID operational frequencies. Such common materials include many metals, liquids, and even human tissues, including skin.

What is desired therefore is an RFID tag that addresses these deficiencies.

SUMMARY OF THE INVENTION

It is an object of the invention to provide an RFID tag designed to minimize RF signal degradation due to proximity to a mounting surface. The RFID tag is formed such that the RFID inlay portion of the tag is held away from the surface to which the tag is affixed. This arrangement has the advantage of creating a gap between the RFID transponder antenna and the mounting surface such that the degree of degradation caused to the signal from the proximity of the surface is reduced.

Alternative embodiments of the invention affix the RFID tag to the mounting surface in such a way as to describe a flexible arch, the RFID inlay portion being disposed in the central portion of the arch, such that it is held away from the mounting surface. The arched shape of the central portion has the advantage of inherently resisting pressure that would push the RFID inlay portion toward the mounting surface. This helps to avoid unwanted RF signal degradation from proximity to the mounting surface.

Other alternative embodiments incorporate perforations such that the central portion of the RFID tag containing the RFID inlay can be cleanly and easily removed from the tag while it is mounted.

Still other alternative embodiments of the invention can incorporate tamper-evident materials such that attempts to remove the RFID tag are easily detectible upon visual inspection.

In further embodiments, portions of the RFID tag can be extended in such a way that the RFID tag may adhere to itself in some locations, such that the RFID tag forms a wrist band.

DETAILED DESCRIPTION OF THE INVENTION

Figure 1:
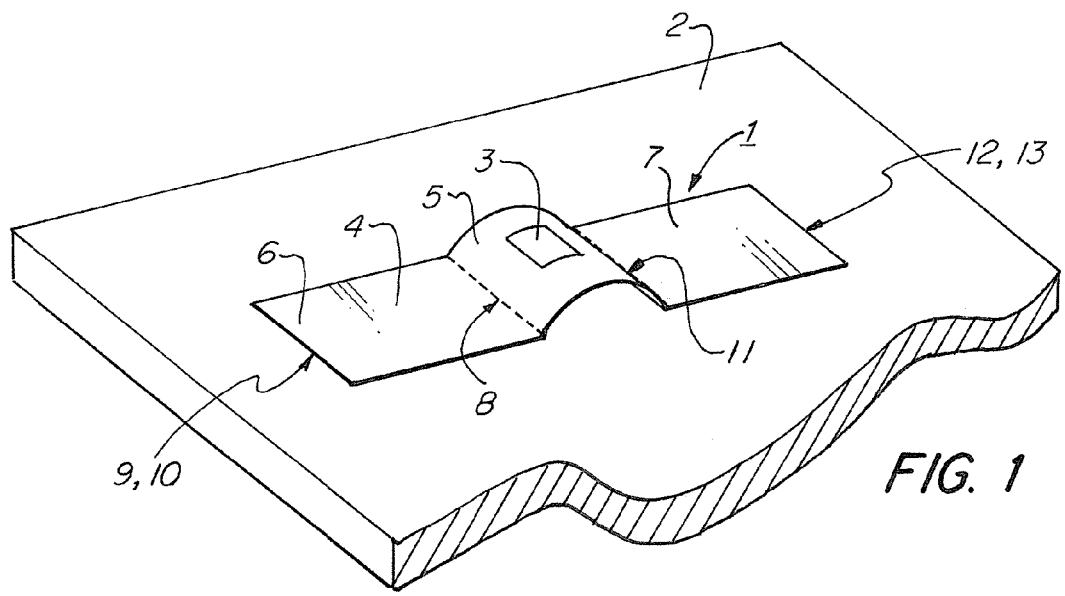
FIG. 1 is a perspective view of an RFID tag affixed to a mounting surface.

FIG. 1 illustrates an overview of a RFID tag 1 affixed to a mounting surface 2, according to an embodiment of the invention. RFID tag 1 comprises an RFID inlay 3, and mounting strip 4. RFID inlay 3 may comprise a radio transponder, antenna, power source, microprocessor, and/or storage space, which together are adapted to receive a radio frequency signal from an RFID reader (not shown) and respond with a radio frequency signal containing information. RFID inlay 3 may be attached, laminated, incorporated into, or otherwise conformed to mounting strip 4 in a suitable manner. Mounting strip 4 may comprise a plastic, paper, composite, laminar, or other suitable material for affixing objects. In alternative embodiments, mounting strip 4 may comprise, in whole or in part, a tamper-evident material (not shown). Mounting strip 4 comprises central portion 5, first side portion 6, and second side portion 7. First side portion 6 has a first inner end 8 disposed toward the central portion 5 and a first outer end 9 coincident with a first edge 10 of the mounting strip 4. Second side portion 7 likewise has a second inner end 11 disposed toward the central portion 5 and a second outer end 12 coincident with a second edge 13 of the mounting strip 4. First side portion 6 and second side portion 7 each have an adhesive surface (not shown) which when in contact with mounting surface 2, serve to affix RFID tag 1.

Figure 2:
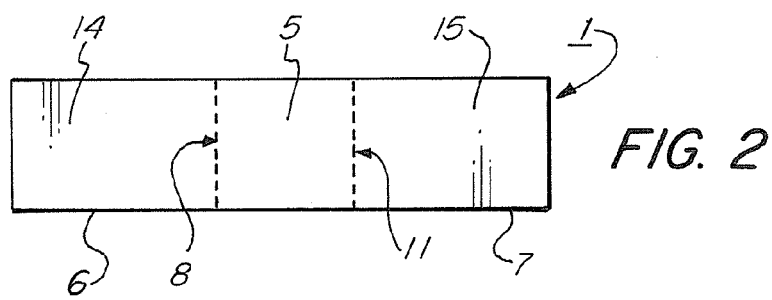
FIG. 2 is an underside view of the RFID tag of FIG. 1.

FIG. 2 illustrates an underside view of the RFID tag 1, showing portions disposed in the direction of a mounting surface (not shown). First side portion 6 comprises first adhesive surface 14, and second side portion 7 comprises second adhesive surface 15. The adhesive surfaces may comprise a gum, glue, hook-and-loop, or other suitable surface for affixing the RFID tag to a mounting surface (not shown). In alternative embodiments, first inner end 8 and second inner end 11 are perforated, such that central portion 5 can be easily and cleanly removed from the RFID tag 1 while adhesive surfaces 14 and 15 are affixed to a mounting surface (not shown).

Figure 3:
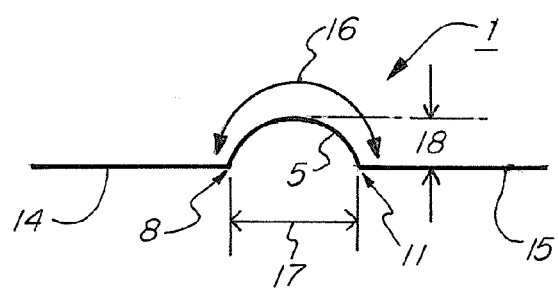
FIG. 3 is a side view of the RFID tag of FIG. 1.

FIG. 3 illustrates a side view of the RFID tag 1, which is shown in its intended configuration when affixed to a mounting surface (not shown). Adhesive surfaces 14 and 15 are affixed to the mounting surface (not shown) in such a way that a length 16 of central portion 5 is greater than a distance 17 between first inner end 8 and second inner end 11, causing central portion 5 to flexibly describe an arch, and lifting central portion 5 away from the mounting surface (not shown) by a maximum distance 18.

Figure 4:
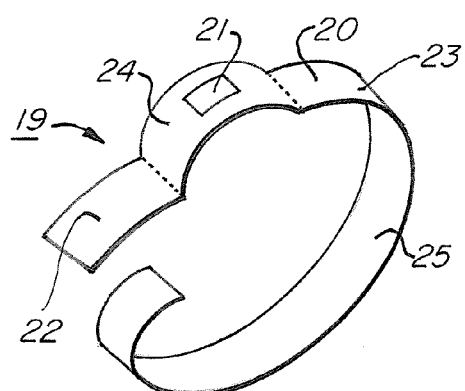
FIG. 4 is a perspective view of an RFID tag according to an alternate embodiment of the invention.

FIG. 4 illustrates an overview of an RFID tag 19 according to an alternate embodiment of the invention. RFID tag 19 may comprise all of the features and materials of RFID tag 1 (not shown) as shown and described above with regard to FIG. 1, including mounting strip 20, RFID inlay 21, first side portion 22, second side portion 23, and central portion 24. Each of these portions is arranged with respect to the others as shown and described with respect to FIGS. 1-3. In addition, RFID tag 19 may comprise extended portion 25 that extends in a continual manner from second side portion 23 such that the overall length of RFID tag 19 is increased in the direction of second side portion 23.

Figure 5:
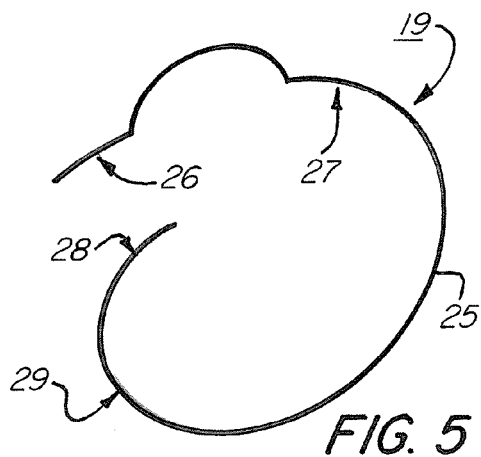
FIG. 5 is a side view of the RFID tag of FIG. 4.

FIG. 5 illustrates a side view of RFID tag 19 according to an alternate embodiment of the invention. Relationships between the components of RFID tag 19 may be as shown and described with respect to FIG. 3 above, including adhesive surfaces 26 and 27. In addition, RFID tag 19 may comprise extended portion 25 as shown and described with respect to FIG. 4. Adhesion locations 28 and 29 are disposed on extended portion 25 to provide a corresponding surface upon which adhesive surfaces 27 and 26 may adhere, respectively. Adhesion locations 28 and 29 may comprise the material of extended portion 25, or may be treated or comprised in such a way as to promote adhesion, or to render tampering evident.

Figure 6:
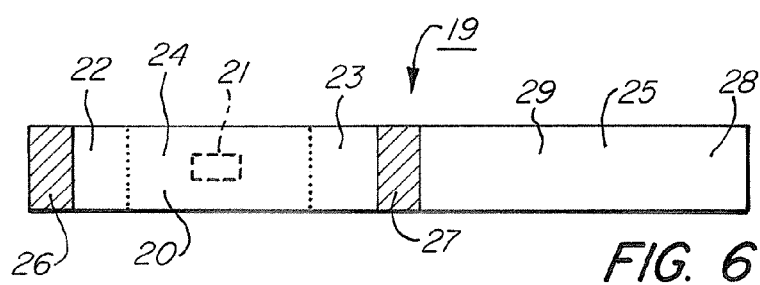
FIG. 6 is an underside view of the RFID tag of FIG. 4.

FIG. 6 illustrates an underside view of RFID tag 19 according to an alternative embodiment of the invention. RFID tag 19 may comprise all of the features of RFID tag 1 as shown and described with respect to FIGS. 4 and 5, including mounting strip 20, RFID inlay 21, first side portion 22, second side portion 23, central portion 24, adhesive surfaces 26 and 27, and adhesion locations 28 and 29. Each of these portions is arranged with respect to the others as shown and described with respect to FIGS. 1-3. In addition, RFID tag 19 may comprise extended portion 25 that extends in a continual manner from second side portion 23 such that the overall length of RFID tag 19 is increased in the direction of second side portion 23.

Figure 7:
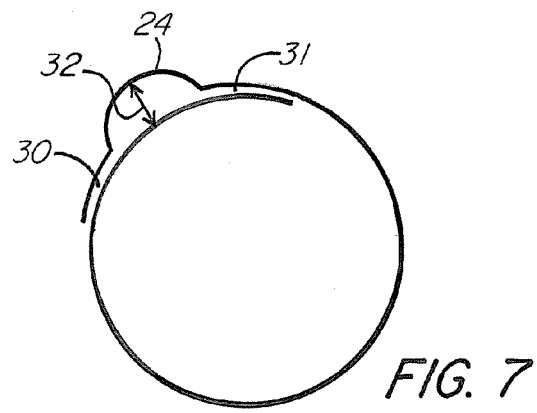
FIG. 7 is a side view of the RFID tag of FIG. 4.

FIG. 7 illustrates a side view of RFID tag 19 which is similar to the side view shown and described with respect to FIG. 5 except in that RFID tag 19 is shown in an assembled state where corresponding adhesion surface and location 26 and 29, as well as corresponding adhesion surface and location 27 and 28 are joined to form fixations 30 and 31, respectively. Fixations 30 and 31 are formed in such a way that RFID tag 19 may have been fixedly looped through or around an object, e.g., around a wrist to form a wrist band. Fixations 30 and 31 are further formed and located to cause central portion 24 to flexibly describe an arch, and to lift central portion 24 away from the object about which RFID tag 19 is fixedly looped by at least distance 32.

Figure 8:
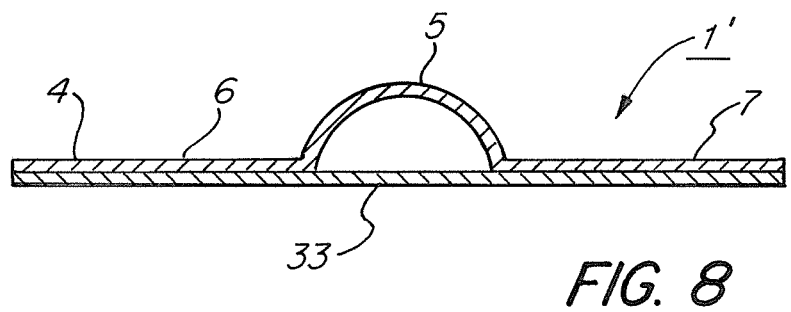
FIG. 8 is side cross-sectional view of an RFID tag according to an alternate embodiment of the invention.

FIG. 8 illustrates an overview of an RFID tag 1' according to an alternate embodiment of the invention. RFID tag 1' may comprise all of the features and materials of RFID tag 1 (not shown) as shown and described above with regard to FIG. 1, including mounting strip 4, central portion 5, first side portion 6, and second side portion 7. The main difference between the embodiment shown in FIG. 1 and the embodiment shown in FIG. 8, however, is that the RFID tag 1' shown in FIG. 8 further includes a substrate 33, on which the first side portion 6 and the second side portion 7 of mounting strip 4 are affixed, such as by an adhesive, heat sealing, ultrasonic welding, or the like, with the air gap created between the central portion 5 and the substrate 33. The rear surface of substrate 33 may then be provided with an adhesive, such as a gum, glue, hook-and-loop, or other suitable surface for affixing the RFID tag 1' to a mounting surface (not shown). By providing the mounting strip already affixed to the substrate 33, with the air gap created therebetween in the vicinity of the central portion 5, attachment to the mounting surface (not shown) may be facilitated, in that it is not necessary to ensure that the first side portion 6 and the second side portion 7 are properly positioned on the mounting surface in order to create the air gap. Also, it should be noted that the mounting surface may comprise a surface of any of numerous articles, such as a box, a container, a wrist band, or substantially any other surface where provision of an RFID tag may be desirable.

What is claimed is:

1. A radio frequency identification tag comprising:
    a mounting strip comprising a central portion having a length and two side portions separated by the central portion, each of the two side portions having an inner end disposed toward the central portion;
    a radio frequency identification inlay disposed in or on the central portion of said mounting strip;
    said radio frequency identification tag being adapted to be attached to a mounting surface such that a distance between the inner ends of each of the two side portions of said mounting strip is less than the length of the central portion of said mounting strip, and such that the central portion defines an arch wherein said radio frequency identification inlay is separated from the mounting surface by an air gap; and
    wherein each of the two side portions of said mounting strip has a rear surface comprising an adhesive surface and the central portion of said mounting strip has a rear surface without being provided with an adhesive surface, and wherein the adhesive surface of each of the two side portions of said mounting strip is adapted to be affixed to the mounting surface.

2. The radio frequency identification tag of claim 1 wherein the adhesive surface of each of the two side portions of said mounting strip comprises at least one of the following: a pressure sensitive adhesive, a gum, a glue, and a portion of a hook-and-loop fastening system.

3. A radio frequency identification tag comprising:
    a mounting strip comprising a central portion having a length and two side portions separated by the central portion, each of the two side portions having an inner end disposed toward the central portion;
    a radio frequency identification inlay disposed in or on the central portion of said mounting strip;
    said radio frequency identification tag being adapted to be attached to a mounting surface such that a distance between the inner ends of each of the two side portions of said mounting strip is less than the length of the central portion of said mounting strip, and such that the central portion defines an arch wherein said radio frequency identification inlay is separated from the mounting surface by an air gap; and
    a substrate having a rear surface comprising an adhesive surface adapted to be attached to the mounting surface, the two side portions of said mounting strip being attached to said substrate such that a distance between the inner ends of each of the two side portions of said mounting strip is less than the length of the central portion of said mounting strip, and such that the central portion defines an arch wherein said radio frequency identification inlay is separated from both the substrate and the mounting surface by an air gap.

4. The radio frequency identification tag of claim 3 wherein the adhesive surface of said substrate comprises at least one of the following: a pressure sensitive adhesive, a gum, a glue, and a portion of a hook-and-loop fastening system.

5. The radio frequency identification tag of claim 3 wherein the two side portions of said mounting strip are attached to said substrate by at least one of the following: an adhesive, a heat seal, and an ultrasonic weld.

6. A radio frequency identification tag comprising:
a mounting strip comprising a central portion having a length and two side portions separated by the central portion, each of the two side portions having an inner end disposed toward the central portion;
a radio frequency identification inlay disposed in or on the central portion of said mounting strip;
said radio frequency identification tag being adapted to be attached to a mounting surface such that a distance between the inner ends of each of the two side portions of said mounting strip is less than the length of the central portion of said mounting strip, and such that the central portion defines an arch wherein said radio frequency identification inlay is separated from the mounting surface by an air gap; and
wherein said mounting strip includes perforations disposed between the central portion and each of the two side portions such that the central portion is detachable from the two side portions while the two side portions remain disposed on the mounting surface.

7. A method of attaching a radio frequency identification tag comprising the steps of:
providing a radio frequency identification tag comprising a mounting strip comprising a central portion having a length and two side portions separated by the central portion, each of the two side portions having an inner end disposed toward the central portion, and a radio frequency identification inlay disposed in or on the central portion of said mounting strip;
providing an article having a mounting surface;
attaching the radio frequency identification tag to the mounting surface such that a distance between the inner ends of each of the two side portions of the mounting strip is less than the length of the central portion of the mounting strip, and such that the central portion defines an arch wherein the radio frequency identification inlay is separated from the mounting surface by an air gap; and
wherein each of the two side portions of the mounting strip has a rear surface comprising an adhesive surface and the central portion of the mounting strip has a rear surface without being provided with an adhesive surface, and wherein said attaching step comprises affixing the adhesive surface of each of the two side portions of the mounting strip to the mounting surface.

8. The method of claim 7 wherein the adhesive surface of each of the two side portions of the mounting strip comprises at least one of the following: a pressure sensitive adhesive, a gum, a glue, and a portion of a hook-and-loop fastening system.

9. A method of attaching a radio frequency identification tag comprising the steps of:
providing a radio frequency identification tag comprising a mounting strip comprising a central portion having a length and two side portions separated by the central portion, each of the two side portions having an inner end disposed toward the central portion, and a radio frequency identification inlay disposed in or on the central portion of said mounting strip;
providing an article having a mounting surface;
attaching the radio frequency identification tag to the mounting surface such that a distance between the inner ends of each of the two side portions of the mounting strip is less than the length of the central portion of the mounting strip, and such that the central portion defines an arch wherein the radio frequency identification inlay is separated from the mounting surface by an air gap; and
wherein the radio frequency identification tag further comprises a substrate having a rear surface comprising an adhesive surface, wherein said attaching step comprises affixing the adhesive surface of the substrate to the mounting surface, and wherein the two side portions of the mounting strip are attached to said substrate such that a distance between the inner ends of each of the two side portions of the mounting strip is less than the length of the central portion of the mounting strip, and such that the central portion defines an arch wherein the radio frequency identification inlay is separated from both the substrate and the mounting surface by an air gap.

10. The method of claim 9 wherein the adhesive surface of the substrate comprises at least one of the following: a pressure sensitive adhesive, a gum, a glue, and a portion of a hook-and-loop fastening system.

11. The method of claim 9 wherein the two side portions of the mounting strip are attached to the substrate by at least one of the following: an adhesive, a heat seal, and an ultrasonic weld.

12. A method of attaching a radio frequency identification tag comprising the steps of:
providing a radio frequency identification tag comprising a mounting strip comprising a central portion having a length and two side portions separated by the central portion, each of the two side portions having an inner end disposed toward the central portion, and a radio frequency identification inlay disposed in or on the central portion of said mounting strip;
providing an article having a mounting surface;
attaching the radio frequency identification tag to the mounting surface such that a distance between the inner ends of each of the two side portions of the mounting strip is less than the length of the central portion of the mounting strip, and such that the central portion defines an arch wherein the radio frequency identification inlay is separated from the mounting surface by an air gap; and
wherein the mounting strip includes perforations disposed between the central portion and each of the two side portions such that the central portion is detachable from the two side portions while the two side portions remain disposed on the mounting surface.

* * * * *